United States Patent [19]

Chess et al.

[11] Patent Number: 4,461,750
[45] Date of Patent: Jul. 24, 1984

[54] INFRARED WINDOW MATERIALS AND THEIR FABRICATION

[75] Inventors: Daniel L. Chess; William B. White, both of State College, Pa.

[73] Assignee: The United States of America as represented by the Secretary of the Navy, Washington, D.C.

[21] Appl. No.: 410,788

[22] Filed: Aug. 23, 1982

[51] Int. Cl.³ .............................................. C01F 17/00
[52] U.S. Cl. .................................... 423/263; 423/511; 501/904; 501/152; 252/587
[58] Field of Search ................ 423/263, 511; 252/584, 252/587; 264/1.2; 501/152, 904

[56] References Cited

FOREIGN PATENT DOCUMENTS 2139620  1/1973  France .................................. 423/263
49-55593  5/1974  Japan .................................... 423/263

OTHER PUBLICATIONS

Chess et al., J. Am. Ceram. Soc., V. 66, No. 1, pp. 18–22, (Jan. 1983).
White et al., Proc. SPIE–Int. Soc. Opt. Eng., V. 297, pp. 38–43, (1981).

Primary Examiner—John Doll
Assistant Examiner—Steven Capella
Attorney, Agent, or Firm—Robert F. Beers; Arthur A. McGill; Prithvi C. Lall

[57] ABSTRACT

Process for making densified ternary sulfide ceramics as infrared window materials using sulfide compounds $MLn_2S_4$ belonging to the $Th_3P_4$, $CaFe_2O_4$ and spinel structure types. These refractory sulfides show good sinterability especially when fired in flowing hydrogen sulfide, and they can be densified by a combination of hot-pressing and hot-isostatic pressing into ceramic pieces approaching their theoretical density with closed pores and which have good transmission characteristics in the infrared region.

12 Claims, 4 Drawing Figures

INFRARED WINDOW MATERIALS AND THEIR FABRICATION

BACKGROUND OF THE INVENTION

This invention is related to ceramic window materials and, more particularly, to densified ternary sulfides to be used as infrared window materials and fabrication thereof.

Infrared transmitting materials particularly for the 8-14 μm region (1 μm is equal to $10^{-6}$ meters) are necessary for sensor windows and domes on satellites, missiles and other similar devices. These materials must be chemically stable, abrasion resistant, have low coefficients of thermal expansion, high melting temperatures and good optical transmission characteristics in the desired region of the infrared. The materials used in the past are alkali halides, zinc sulfide and zinc selenide. However, these materials do not have the hardness and abrasion resistance required for most of the above-enumerated applications. Furthermore, the optical transmission of the zinc sulfide and zinc selenide materials is deficient at the long wavelength end of the infrared region of interest. It is also desirable that any window material must be a theoretically dense compact of high purity in order to fulfill the criteria listed above. Single crystals are considered ideal for subject applications, but it is extremely difficult to prepare single crystals in the sizes required for window applications. Polycrystalline ceramics are suitable as windows, provided that densification is complete, scattering centers are kept to a sufficiently low level, and the ceramics are made from cubic compounds to avoid optical anisotropy from the randomly oriented grains. It is thus desirable to have some infrared transmitting materials having the above-mentioned characteristics.

SUMMARY OF THE INVENTION

Suitable infrared-transmitting materials according to the teachings of subject invention have been identified in the densified ternary alkaline earth-rare earth sulfides. A novel densification procedure has been developed which produces optical quality material by a two step process. First, uniaxial vacuum hot-pressing is used to close porosity in the samples of the ternary sulfides and then hot isostatic pressing (HIP) is used to remove residual porosity. The fabrication of ternary sulfides is accomplished by placing a few grams of the ternary sulfide powder into a one-inch diameter punch and die assembly machined from graphite cylinders. The die walls and plunger faces are coated with a slurry of boron nitride and ethanol (ethyl alcohol) which when dry acts as a reaction barrier. The die and sample are placed into a uniaxial vacuum hot-pressing which is evacuated to a pressure of $10^{-5}$ torr (1 torr=1 m.m of Hg) and is heated at a rate of 15° C. per minute through the use of graphite heating elements. At 600° C., the die is fully loaded to a pressure of 6,000 psi (6,000 per square inch) or 40 MPa (1 MPa=1 mega pascal=$10^6$ newtons/meter$^2$). Temperature is increased to 1400° C. and maintained for 5 minutes. Temperature is then lowered slowly at a rate of 15° per minute while pressure is maintained at 40 MPa. Pressure is relieved at 600° C. and the sample is cooled to ambient conditions. The vacuum is released and the sample is extracted after which the sample surfaces are ground to remove any boron nitride. The hot-pressed sample is wrapped in platinum foil and placed in a hot-isostatic press. A uniform temperature gradient is maintained by using ceramic barriers such as alumina crucibles placed around the furnace to minimize heat loss. The system is sealed and then evacuated to a high vacuum. The sample chamber is then backfilled with argon to a pressure of 20 MPa and is heated at a rate of 12° C. per minute to 1400° C. The pressure is increased to 24 MPa and held for 90 minutes. The sample is then cooled slowly at the rate of 12° C. per minute to ambient conditions with the pressure maintained at 3500 psi. Pressure is then relieved and the HIP sample is removed. This process produces final specimens as discs, 2 centimeters in diameter and 0.3 centimeters thick. The present materials were yellow and translucent to visible light. The grain size of the final product was of the order of 12 μm and electron microscope images when scanned showed no evidence for pore space in the final products.

An object of the subject invention is to fabricate infrared transmitting window materials.

Another object of the subject invention is to fabricate infrared window materials which are chemically stable and are abrasion resistant.

Still another object of the subject invention is to fabricate infrared window materials which have low coefficient of thermal expansion.

Still another object of the subject invention is to fabricate window materials which are free of porosity and are dense to their theoretical limit with closed pores.

Other objects, advantages and novel features of the invention will become apparent from the following detailed description thereof when considered in conjunction with the accompanying drawings wherein:

DESCRIPTION OF A PREFERRED EMBODIMENT

According to the teachings of subject invention a new family of window materials for the 8-14 μm (1 μm=micrometer=$10^{-6}$ meter) infrared band have been fabricated. The materials are densified ternary sulfides with a generalized formula $MLn_2S_4$ of the many structural families of ternary sulfides. The compounds with the cubic $Th_3P_4$ structure have been fabricated wherein the M-cation of $Th_3P_4$-structure ternary sulfides is a large alkaline earth ion such as $Ba^{+2}$, $Sr^{+2}$, or $Ca^{+2}$. The Ln-cation is one of the light lanthanides, $La^{3+}$ through $Gd^{3+}$. Densified ternary sulfide Ca-$La_2S_4$ is a typical member of the group of ternary sulfide having $Th_3P_4$ structure and isotropic optical properties. The $Th_3P_4$ structure is cubic, space group I$\bar{4}$3d, with 4 formula units in the unit cell. Both divalent and trivalent cations occupy the same 8-coordinated site. Table 1 indicates the densified ternary sulfides synthesized according to the teachings of the subject invention and from the powder diffraction data revised unit cell parameters calculated are also known in Table 1 on the following page.

TABLE 1

Parameters for Some Th$_3$P$_4$ Structure Type Compounds

| Compound | Melting Point (°C.) | Lattice Parameter (Å) | Band Gap (eV ± 0.05 eV) |
|---|---|---|---|
| BaLa$_2$S$_4$ | NA | 8.917 | 2.85 |
| CaLa$_2$S$_4$ | 1810 ± 25° C. | 8.687 | 2.70 |
| CaNd$_2$S$_4$ | NA | 8.533 | 2.70 |
| CaPr$_2$S$_4$ | 1850 | 8.578 | 2.90 |
| CaSm$_2$S$_4$ | 1830 | 8.472 | 2.05 |
| CaGd$_2$S$_4$ | 1990 | 8.423 | 2.55 |
| SrLa$_2$S$_4$ | NA | 8.790 | 2.85 |
| SrNd$_2$S$_4$ | 1825 | 8.649 | 2.45 |
| SrPr$_2$S$_4$ | 1890 | 8.682 | 2.70 |
| SrSm$_2$S$_4$ | 1880 | 8.595 | NA |
| SrGd$_2$S$_4$ | 1980 | 8.551 | NA |

*NA = Not Available

The ternary sulfides were prepared in powder form by reacting cabonates of the alkaline earth elements with either oxides or hydroxides of the lanthanide elements at 100° C. in an atmosphere of flowing H$_2$S. The overall reaction is given by:

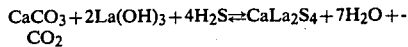

$$CaCO_3 + 2La(OH)_3 + 4H_2S \rightleftharpoons CaLa_2S_4 + 7H_2O + CO_2$$

Figure 2:
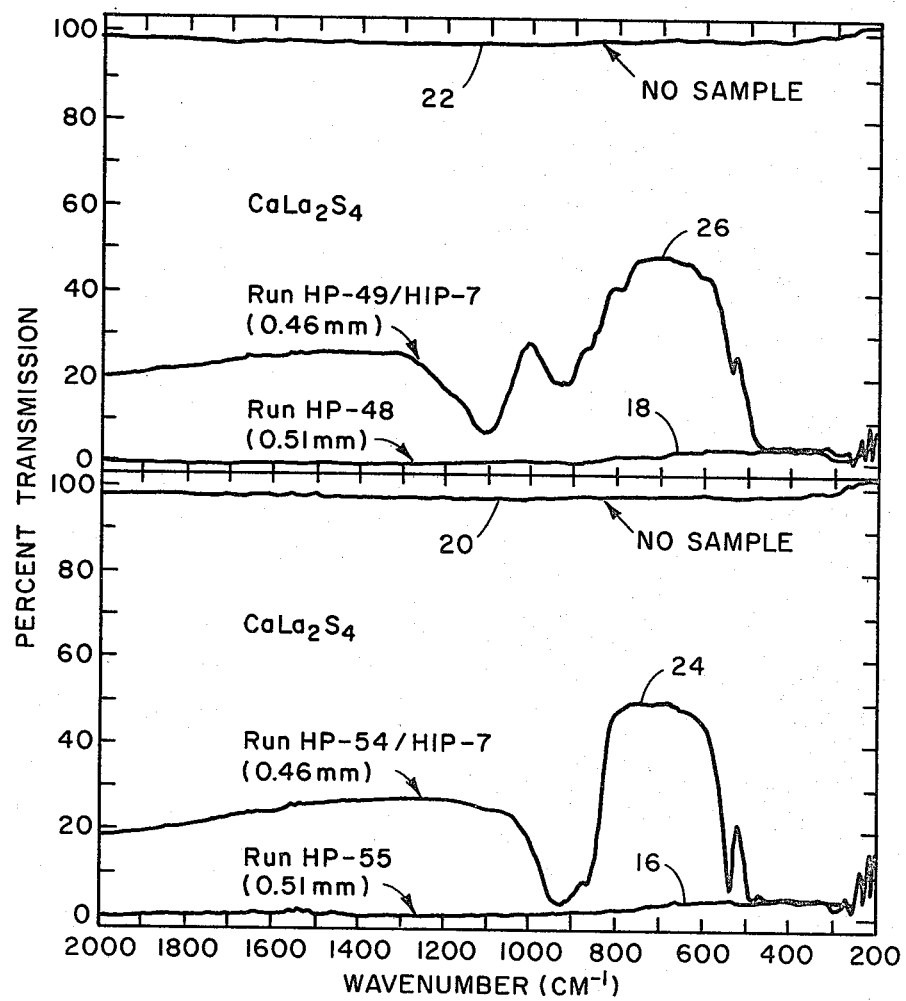
FIG. 2 represents infrared transmission spectra of two samples of ternary sulfide ceramics.

The powder of the starting materials were mixed in the correct stoichiometric ratio, placed in boats of pyrolytic graphite and inserted into silica-glass furnace tubes. Typical reaction times were from 3 to 7 days. Since it was found difficult to achieve the exact stoichiometric required by the ternary sulfide compounds, the end product contained CaS as an impurity. CaLa$_2$S$_4$ is stable in the presence of water but CaS is not and was thus removed by washing. The washing procedure, however, caused some hydrolysis of grain surfaces which was removed by a second firing at 800° C. in H$_2$S for a few hours. Any needed grinding or powder processing was also done before the second firing step. Two samples of CaLa$_2$S$_4$; HP-49/HIP-7 and HP-54/HIP-7 were prepared by a two stage process of hot-processing followed by hot-isostatic pressing. Compaction by hot-pressing produced materials of near theoretical density after long pressing times but reaction between the ternary sulfide and the graphite dies of the hot-pressing caused a sulfur deficiency and corresponding electronic absorption leading to lower wavelength cut-off. A 15-minute densification in the hot-press produced CaLa$_2$S$_4$ discs that ranged from 85 to 90% theoretical density with closed pores. Further densification was obtained by insertion of these discs into the hot isostatic press with preparation conditions shown in Table 2 below and some of their transmission characteristics are shown in FIG. 2.

TABLE 2

Preparation Conditions for CaLa$_2$S$_4$ Optical Ceramics

| Powder Preparation | Hot-Pressing | | | Hot Isostatic Pressing | | |
|---|---|---|---|---|---|---|
| | T (°C.) | P (MPa) | t (hr) | T (°C.) | P (MPa) | t (hr) |
| HP-49/HIP-7 | 1450° C. | 20 | 0.25 | 1400° C. | 24 | 2.0 |
| HP-54/HIP-7 | 1450° C. | 41 | 0.25 | 1400° C. | 24 | 2.0 |

The final specimens were discs, 2 cm in diameter and 0.3 cm thick. The materials so obtained were yellow and translucent to visible light. The grain size of the final product was of the order of 12 μm. Scanning electron microscope images showed no evidence for pore space in the final products.

Figure 1:
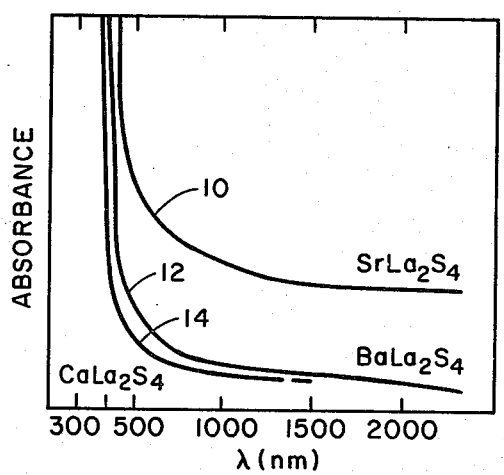
FIG. 1 is a graphical representation of optical absorption edge measured by diffuse reflectance for different ternary sulfides.

As shown in FIG. 1, curves 10, 12, and 14 graphically indicate optical absorption edge measured by standary diffuse reflectance techniques. As can be shown from FIG. 1, these ternary sulfides are opaque to radiation of wavelength less than 500 nm (1 nm is equal to 10$^{-9}$ meter).

FIG. 2 shows the infrared transmission spectra of the samples HP-49/HIP-7, and HP-54/HIP-7 of CaLa$_2$S$_4$. Curves 16 and 18 are the infrared transmission spectra for the two samples without undergoing hot-isotropic pressing (HIP). Curves 20 and 22 represent the infrared transmission spectra without the use of any sample and curves 24 and 26 represent the infrared transmission spectra using the final products of the samples Run HP-54/HIP-7 and Run HP-49/HIP-7, respectively.

Figure 3:
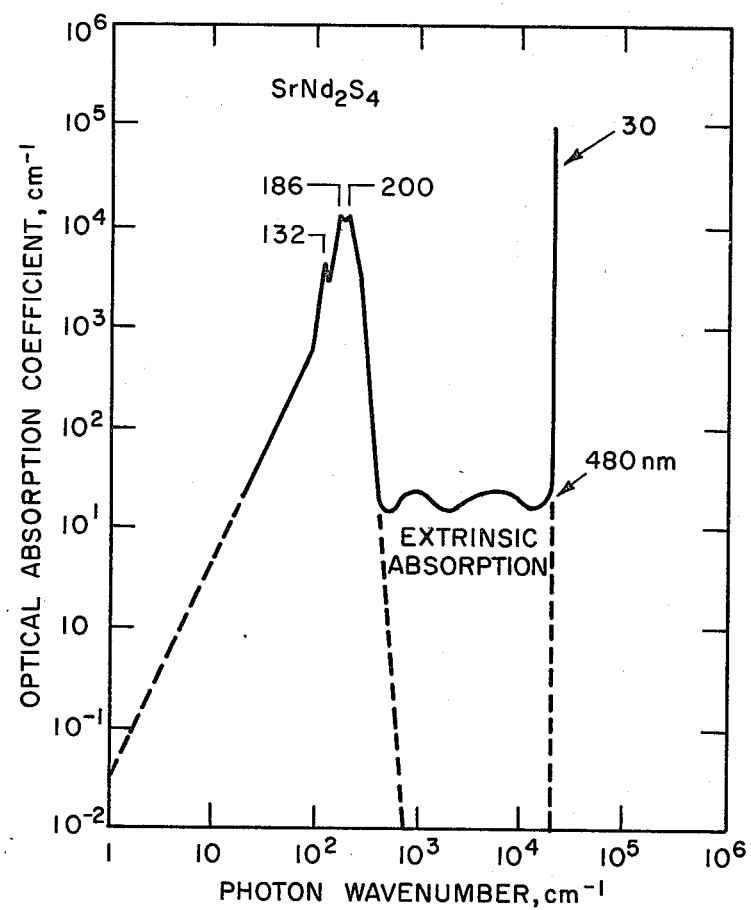
FIG. 3 graphically represents absorption spectrum for a ternary sulfide showing available window region in the infrared.
Figure 4:
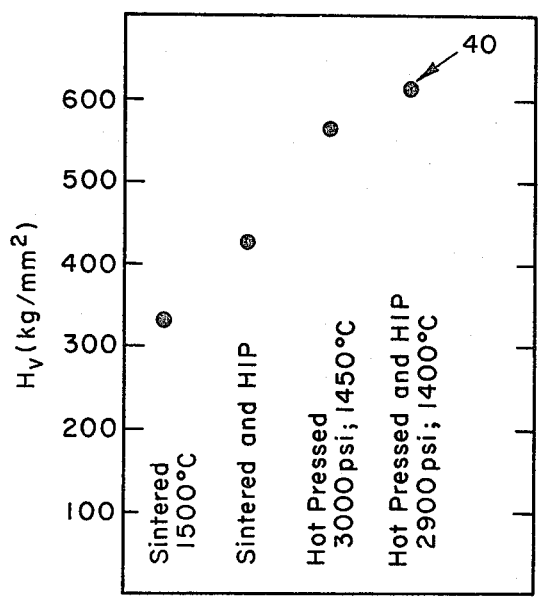
FIG. 4 diagramatically represents microhardness of a ternary sulfide processed in different ways.

FIG. 3 graphically represents the absorption spectrum of SrNdS$_4$ showing available window region as depicted by curve 30. As can be seen from FIG. 3, the left hand portion of curve 30 represents the absorption edge of the window resulting from vibration absorption of the radiant energy and the right hand edge of curve 30 indicates the electronic excitation resulting in the right hand edge of the infrared window. FIG. 4 represents diagramitically microhardness (Hv-kg/mm$^2$) for CaLa$_2$S$_4$ processed in different ways. It can be seen from FIG. 4 that a sample which is hot-pressed and HIP processed has the highest microhardness as shown by dot 40. The densified ternary sulfides fabricated using the teachings of subject invention were found to be stable indefinitely in contact with the ambient atmosphere. There was no evidence for fogging or frosting on polished surfaces when exposed to atmospheric water vapor for periods of many months.

The high temperature stability of the samples was tested by boiling chips of CaLa$_2$S$_4$ ceramics in a Soxhlet extractor for several weeks.

According to the teachings of subject invention new infrared window materials in the form of densified ternary sulfides have been fabricated using a two-step process of hot-pressing and hot-isostatic pressing of the ternary sulfides. The densified ternary sulfides so obtained are chemically stable, abrasion resistant and have low coefficients of thermal expansion and high melting temperatures. Furthermore, these materials have good optical transmission in the infrared region of 8–14 μm.

Obviously, many modifications and variations of the present invention are possible in the light of the above teachings. As an example, the densification of the ternary sulfides so as to reach their theoretical density can be achieved by changing various parameters such as pressure and temperature. Furthermore, the densified ternary sulfides can also be prepared by using chemical reaction other than the one described above.

It is, therefore, understood that within the scope of the appended claims, the invention may be practiced otherwise than as specifically described.

What is claimed is:

1. Densified ternary alkaline earth-rare earth sulfides having relatively low porosity and density equal to the theoretical density thereof for infrared windows represented by a formula:

$$MLn_2S_4$$

wherein M, Ln and S are a member of the group consisting of $Ba^{+2}$, $Sr^{+2}$ and $Ca^{+2}$, light lanthanide ion and sulfide ion respectively.

2. The densified ternary sulfides of claim 1 wherein said sulfides exhibit cubic $Th_3P_4$ like structure.

3. The densified ternary sulfides of claim 2 wherein said light lanthanide ion is a member of a group consisting of rare earths from La to Gd.

4. The densified ternary sulfides of claim 1 wherein $CaLa_2S_4$ is a representative member thereof.

5. The densified ternary sulfides of claim 1 wherein $SrLa_2S_4$ is another member thereof.

6. The densified ternary sulfides of claim 2 which have about 50% transmission of infrared radiation in the 8–14 micrometer region.

7. A process for densifying to the theoretical limit ternary alkaline earth-rare earth sulfides represented by $MLn_2S_4$, wherein M, Ln and S representing alkaline earth, light lanthanide and sulfide ions respectively, which includes the steps of:

obtaining said ternary alkaline earth-rare earth sulfides by reacting carbonates of the alkaline earth elements with oxides of lanthanide elements in an atmosphere of flowing hydrogen sulfide;

hot pressing said ternary alkaline earth-rare earth sulfides for densification thereof; and hot-isostatic pressing the densified ternary alkaline earth-rare earth sulfides resulting from said step of hot-pressing for further densification thereof.

8. The process of claim 7 wherein the step of obtaining ternary alkaline earth-rare earth sulfides includes reacting carbonates of alkaline earth elements with hydroxides of lanthanide elements in an atmosphere of flowing hydrogen sulfide.

9. The process of claim 7 wherein the step of obtaining said ternary alkaline earth-rare earth sulfides includes grinding and milling.

10. The process of claim 8 wherein said step of hot pressing of said ternary sulfides is accomplished uniaxially by applying pressure along an axis.

11. The process of claim 9 wherein said step of isostatic-pressing of said ternary sulfides is accomplished in an atmosphere of an inert gas.

12. The process of claim 11 which involves using argon as said inert gas.

* * * * *